United States Patent
Nageswaran et al.

(10) Patent No.: US 6,738,974 B1
(45) Date of Patent: May 18, 2004

(54) APPARATUS AND METHOD FOR SYSTEM RESOURCE OBJECT DEALLOCATION IN A MULTI-THREADED ENVIRONMENT

(75) Inventors: Parthasarathy Nageswaran, Rochester, MN (US); Eric Jon Van Norman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/151,041

(22) Filed: Sep. 10, 1998

(51) Int. Cl.⁷ .............................................. G06F 9/00
(52) U.S. Cl. ...................... 719/104; 719/102
(58) Field of Search ................ 709/101, 102, 709/104; 710/200, 264, 246

(56) References Cited

U.S. PATENT DOCUMENTS

| | | | | |
|---|---|---|---|---|
| 4,604,694 A | * | 8/1986 | Hough | 364/200 |
| 5,754,854 A | * | 5/1998 | Kanamori et al. | 395/674 |
| 5,938,722 A | * | 8/1999 | Johnson | 709/105 |
| 6,105,098 A | * | 8/2000 | Ninose et al. | 710/200 |
| 6,243,668 B1 | * | 6/2001 | Le et al. | 703/27 |
| 6,278,691 B1 | * | 8/2001 | Ohyama et al. | 370/235 |

* cited by examiner

*Primary Examiner*—Meng-Al T. An
*Assistant Examiner*—The Thanh Ho
(74) *Attorney, Agent, or Firm*—Schmeiser, Olsen & Watts; Leslie J. Payne

(57) ABSTRACT

A shared resource registry is created and maintained by the system to control allocation and deallocation of shared system resources. The shared resource registry will contain information regarding the allocation and control of shared system resources. By accessing shared system resources through the shared resource registry, control of the shared resources is vested in the system instead of individual objects or processes. When the system needs access to a shared resource, it can notify the shared resource registry regarding the desired resource and schedule the termination of the thread or process which has acquired the desired resource. The shared resource registry can then release the desired resource and make it available for another process.

58 Claims, 5 Drawing Sheets

APPARATUS AND METHOD FOR SYSTEM RESOURCE OBJECT DEALLOCATION IN A MULTI-THREADED ENVIRONMENT

BACKGROUND OF THE INVENTION

1. Technical Field

This invention generally relates to computer system resource management and more specifically relates to thread management in a multi-threaded programming environment.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computers have increased, the application programs designed for high performance computer systems have become extremely powerful.

One way in which the performance of application software programs has been improved is by using "multi-threaded" programming concepts. In multi-threaded computer programming environments, a single application program or process will typically have multiple sub-processes called "threads." This means that the application program has a number of smaller tasks, each of which can be processed to completion independently. When a process has multiple threads, then the process is said to be a multi-threaded process. In general, there is less system-level overhead in managing a multi-threaded process as opposed to managing multiple processes to accomplish the same task. This is because, unlike independent processes, multiple threads from the same process will co-exist in the same memory space, thereby reducing memory management tasks. Thus, a certain amount of processing efficiency can be obtained by using threads in a multi-threaded operating system environment. Also, by compartmentalizing the various functions of a process into multiple threads that may be processed in parallel, independent tasks can often be completed in a more expeditious fashion.

While the implementation and use of multi-threaded programming concepts has been mostly beneficial, the use of thread concepts is not without certain limits and, occasionally, undesirable side effects. For example, there is a certain amount of overhead incurred in the computer system as the threads are allocated and tracked by the multi-threaded operating system. Additionally, depending on the allocation of shared system resources among different threads, conflicts in resource utilization can occur. Since many different threads can be processing simultaneously, it is entirely possible that two or more of the threads may need access to a given shared system resource at the same time. However, if a given thread has acquired a resource for use and that thread is terminated unexpectedly for any reason, the acquired resource may become unavailable for other threads, leading to inefficiencies in the processing environment.

For example, a given process running on a thread may be using a shared system resource such as a mutex object. A mutex object is an object that locks a piece of data such that only one thread can control that piece of data at any time. It is a shared system resource because many threads may wish to access the mutex object to get to the piece of data. If the thread is terminated abruptly, such that the thread does not have an opportunity to quiesce its state, the shared mutex object may be "locked-out" and other threads associated with other processes may be unable to access the mutex object, and its concomitant data, for use. This situation may require a complete shutdown of one or more processes to allow the shared resource to be "released" so that the shared resource can be made available for other processes. In another scenario, a process may be "looping" for an extended period of time, using a shared system resource, and thereby preventing other system processes from accessing the shared system resource. In some cases, it may even become necessary to restart the entire system to allow the shared resource to become available for processing again.

In either case, the possible options for solving the problem of obtaining access to a shared system resource are undesirable. If a process or system has to be terminated, there is a significant decrease in overall system performance and a related loss in efficiency, which is also undesirable. However, at present, there are no known solutions for recovering access to shared system resources that have been taken out of operation by a process and its threads, particularly a user-supplied process and its threads, since the overall system will not have control over the usage or allocation of the shared resources controlled by a user-supplied process and its threads.

Therefore, what is needed is a shared system resource allocation and management mechanism for effectively allocating and controlling shared system resources in a multi-threaded environment. Without a mechanism for providing greater control and flexibility over the allocation and management of shared system resources, multi-threaded systems will continue to suffer from significant reductions in productivity and the concomitant loss of profitability when multiple processes need to access and share system-level resources.

BRIEF SUMMARY OF THE INVENTION

According to a preferred embodiment of the present invention, a shared resource registry is created and maintained by the system to control allocation and deallocation of shared system resources. The shared resource registry will contain information regarding the allocation and control of shared system resources. By accessing shared system resources through the shared resource registry, control of the shared resources is vested in the system instead of individual threads. When the system needs access to a shared resource, it can notify the shared resource registry regarding the desired resource and schedule the termination of the thread or process which has acquired the desired resource. The shared resource registry can then release the desired resource and make it available for another process.

BEST MODE FOR CARRYING OUT THE INVENTION

Figure 1:
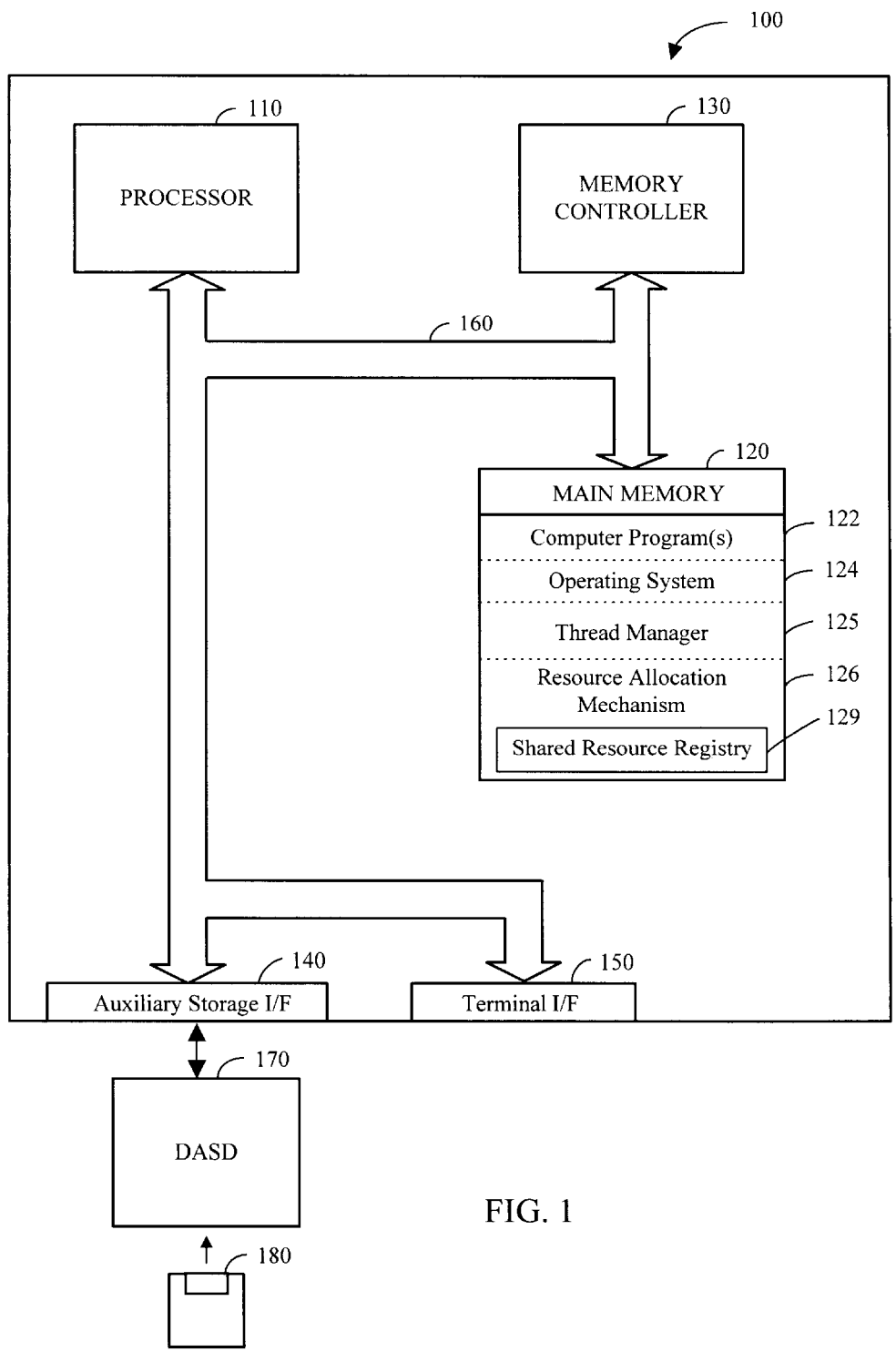
FIG. 1 is a block diagram of an apparatus according to a preferred embodiment of the present invention.

The present invention relates to object-oriented programming techniques and multi-threaded operating systems. For those individuals who are not generally familiar with object-oriented programming or multi-threaded operating systems, the Overview section below presents many of the concepts that will help to understand the invention. Individuals skilled in the art of object-oriented programming and multi-threaded operating systems may wish to skip the Overview section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code that provide one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation, that internal implementation can change without affecting other aspects of the program.

Another central concept in object-oriented programming is the class. A class is a template or prototype that defines a type of object. A class outlines the makeup of objects that belong to that class. By defining a base class, objects can be created that belong to the class without having to rewrite the entire definition for each new object as it is created. Each of the objects will inherit the common characteristics of the base class. This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming to one degree or another.

Multi-threaded Operating Systems

In a multi-threaded system, each process can include one or more "threads." Threads are a type of "mini-process" that shares the address space of their parent process. Because the threads share the resources of the parent process, multiple threads can be spun off at one time without requiring excessive memory resources. For these reasons, a thread is often described as a "light process."

Whenever a multi-threaded process is initialized, a "thread pool" is typically allocated for use with the process. This allocation process establishes a certain number of threads which are made available for use by programs or processes. The allocation, assignment, and control of the threads in the thread pool is managed by a thread manager. The thread manager will typically assign threads at random but, under certain circumstances, may provide a special dedicated thread for a particular process depending on the needs of the various processes.

After a request has run to completion, the thread on which the request had been processed is typically returned to the thread pool for possible use by other processes. The thread manager can also prematurely terminate threads if the thread spends too long performing its request or if the thread is no longer responding. In addition, system administrators or programs that watch threads and keep track of the length of time a thread has been operating can order the thread manager to terminate a thread that is no longer functioning.

While terminating a thread prematurely may return the thread to the thread pool, this has the detrimental effect of not allowing the thread to release shared resource objects (SROs) and other resources it has. SROs, in current systems, cannot be retrieved by the operating system. The SRO, once the thread owning the SRO has been terminated, is simply lost to the system.

Figure 5:
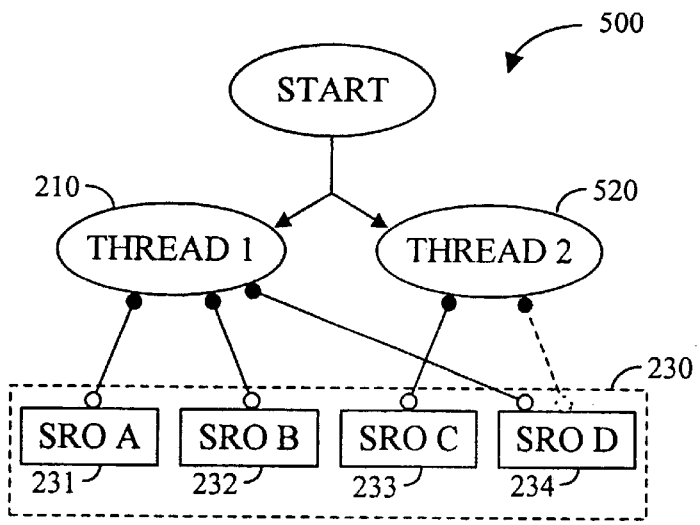
FIG. 5 is a diagram showing allocation of shared system resources in a multi-threaded operating system.
Figure 6:
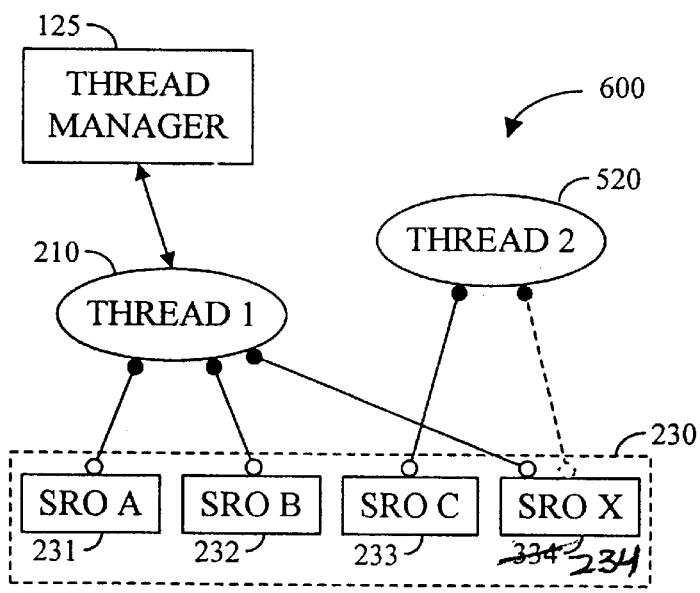
FIG. 6 is a diagram showing the multi-threaded operating system of FIG. 5 operating with a thread manager.

These concepts are illustrated in FIGS. 5 and 6. FIG. 5 shows a multi-threaded shared system resource environment 500 that includes the following: a first thread 210; a second thread 520; and a group of SROs 230. SROs 230 include SRO A 231, SRO B. 232. SRO C 233, and SRO D 234. SROs 230 represent any system-level shared resources such as shared mutex objects, critical section objects, semaphore objects, and software resources. As shown in FIG. 5, thread 210 and thread 520 have, in the normal course of processing, acquired access to one or more of SROs 230. The acquisition, control, and ownership of SRO 230 is represented by the solid lines connecting each of the threads to the respective SROs 230. In this case, thread 210 had acquired SRO 231, SRO 232, and SRO 234 for use by the process that is running on thread 210. Similarly, thread 520 has acquired SRO 233 and needs to acquire SRO 234 in order to complete the process currently running on thread 520. The attempt to acquire SRO 234 by thread 220 is represented by the dashed line in FIG. 5.

In this case, since thread 210 has already acquired SRO 234, thread 520's request to acquire SRO 234 will be deferred until the resource is available and no other thread is waiting ahead of thread 520 for that resource. This deferral is called blocking. Blocking occurs in this instance because thread 210 has an exclusive lock on SRO 234, thereby precluding any other thread from acquiring access to SRO 234. It should be noted that while non-exclusive access is possible for some types of system resources, the present invention deals primarily with resources which are acquired using exclusive locks. For instance, a mutex object that controls access to a piece of data might require an exclusive lock if it is important that the data not be changed by more than one thread. If Thread A asks for and is granted access to the data, Thread B could also ask for and be granted access to the data if the lock on the mutex object is not exclusive. Both threads could change the data without the other thread knowing about the change. This could lead to unpredictable results. As an example, if Thread A subtracts one from the data, which was a one, then the data will be zero. If Thread B read the data when the data was a one but before it got changed to a zero, Thread B may also subtract one from the data after the data was already zero. The data will now be negative, and a negative number for the data could be undefined. In short, an exclusive lock is used any time access to only one thread at a time should be granted. In the present example, as soon as thread 210 releases with SRO 234, thread 520 will be able to acquire SRO 234 and finish processing. In this fashion, various threads can share SROs 230 in a multi-threaded system.

Referring now to FIG. 6, the existing problems inherent in a multi-threaded environment 600 with shared system resources is further illustrated. As explained above relevant to FIG. 5, in FIG. 6 thread 210 and thread 520 have acquired various SROs 230. In this case, thread manager 125 finds it necessary to terminate thread 210. This termination, as described previously, may occur for many different reasons. For example, a system operator may observe that a thread is blocked, unable to perform its normal task and choose to terminate it. For whatever reason, thread manager 125 will terminate thread 210 and stop all processing being performed by thread 210, some of which is relative to the SROs in use by thread 210. In the present case, that would include SRO 231, SRO 232, and SRO 234. Note that when thread 210 is terminated, in accordance with the standard procedures for thread manager 125, the SROs in use by thread 210 are not released and are still unavailable to other threads in the system and cannot be reclaimed absent some outside intervention such as restarting the system. This means that thread 210, which is still trying to acquire and use SRO 234, will not be able to finish the process running on thread 520. Since SROs 231, 232, and 234 are now unavailable to the system, any threads which need to acquire and use any of these SROs will be unable to finish processing until the SROs are released to the system.

2. Detailed Description

The embodiments of the present invention use a resource allocation mechanism that contains, or has access to, a shared resource registry. The shared resource objects are no longer owned by the threads; instead, the resource allocation mechanism owns the shared resource objects and the threads deal with proxies. This design tricks the threads into "thinking" that the proxies are really shared resources. In this manner, the resource allocation mechanism can retake control of shared resource objects at any time.

In general, there are two different techniques to prevent a thread from permanently acquiring system resource objects (SROs). One "gentle" method is to inform the thread that it needs to give up its SROs. A second, more "violent" method is to wait some time period, release the SROs owned on behalf of that thread, and recommend that the thread be terminated. The preferred embodiment of the present invention combines these two techniques. In this combined method, an attempt is made to inform the thread that it needs to release its SROs but, if the thread does not respond or takes too long, the thread's SROs may be forcibly released and the thread slotted for termination.

Referring now to FIG. 1, a computer system 100 in accordance with a preferred embodiment of the present invention is an AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program or programs 122 within main memory 120.

Auxiliary storage interface 140 allows computer system 100 to store and retrieve information from auxiliary storage devices, such as magnetic disks (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180), hard disks and optical disks (e.g., compact disks), and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, an operating system 124, a thread manager 125, and a resource allocation mechanism 126 containing a shared resource registry 129. Computer program 122 in memory 120 is used in its broadest sense, and includes any and all forms of computer programs, including source code, intermediate code, machine code, and any other representation of a computer program. For the purposes of this illustration, program 122 is assumed to be a multi-threaded application. Operating system 124 is a multi-threaded operating system and is capable of performing systems management tasks which are typical of operating systems used in computer systems generally. Resource allocation mechanism 126 and shared resource registry 129 work in concert to provide for systematic allocation and deallocation of shared system resources. It should be noted that even though shared resource registry 129 is shown as one registry, it may in fact be separated into multiple registries as a matter of design and implementation choice.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, although computer program 122 is shown to reside in the same memory location as operating system 124, and resource allocation mechanism 126, it is to be understood that main memory 120 may consist of disparate memory locations. The term "memory" as used herein refers to any storage location in the virtual memory space of system 100.

Figure 2:
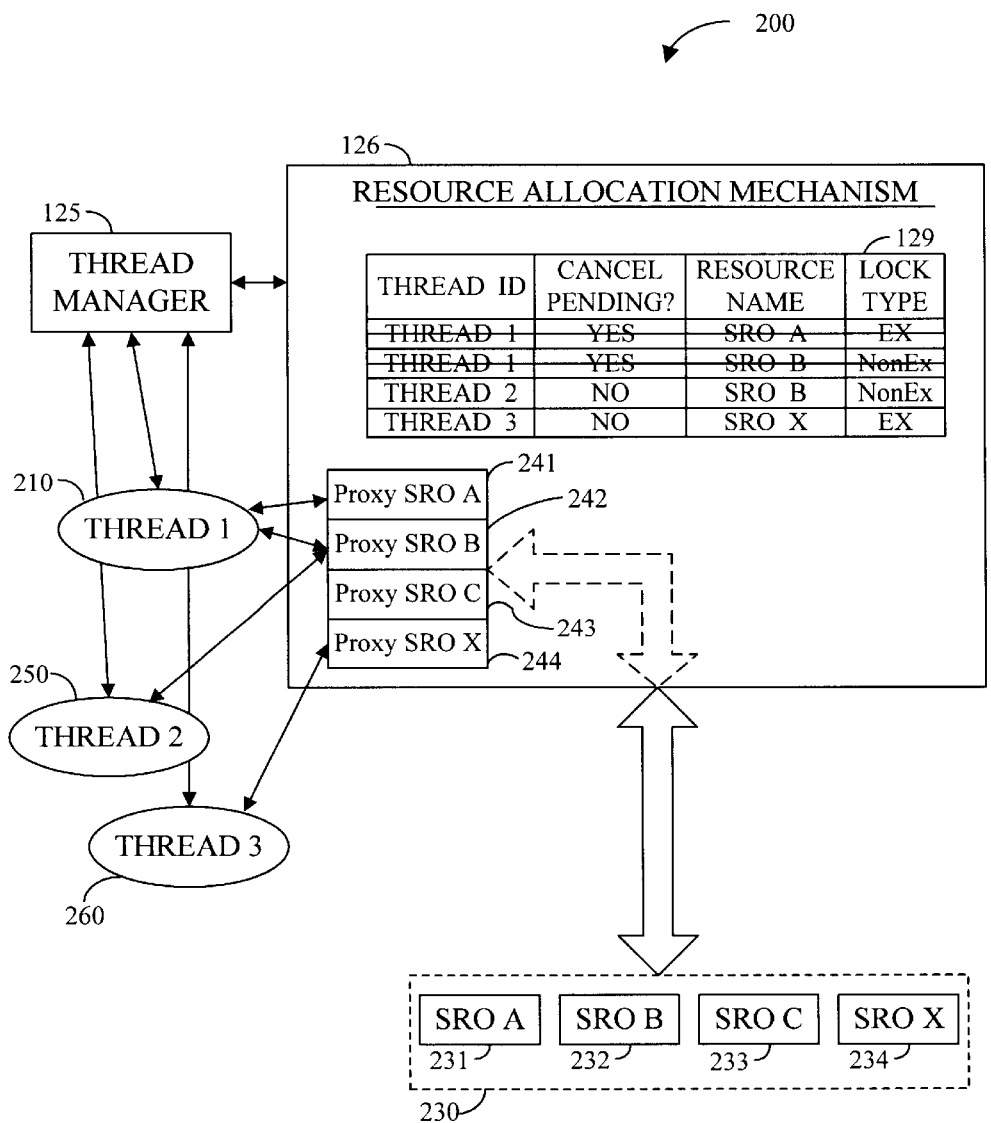
FIG. 2 is a diagram illustrating shared resource allocation according to a preferred embodiment of the present invention.

Referring now to FIG. 2, a multi-threaded processing environment 200 using a shared resource allocation mechanism in accordance with a preferred embodiment of the present invention is illustrated. Multi-threaded processing environment 200 shows the interactions between thread manager 125, resource allocation mechanism 126, thread 210 and SROs 230. Thread manager 125 interacts with all threads (such as threads 210, 250, and 260) and resource allocation mechanism 126. Resource allocation mechanism 126 contains shared resource registry 129 and SRO proxies 241–244. In the preferred embodiments of the present invention, the threads deal with proxies instead of the shared resource objects themselves. Although shared resource registry 129 and proxies 241–244 are shown contained in resource allocation mechanism 126, these could actually be placed anywhere in computer system 100 that resource allocation mechanism 126 can access. In addition, although proxies 241–244, resource allocation mechanism 126, and/or SROs 230 may be implemented as objects in a multi-threaded system, the embodiments of the current invention apply equally well to non-object oriented, multi-threaded systems.

Resource allocation mechanism 126 uses shared resource registry 129 to keep certain information about threads. Although shared resource registry 129 is shown in tabular format, any method known to those skilled in the art that would enable resource allocation mechanism 126 to keep such information may be used. Shared resource registry 129 in this example contains thread identifications, cancel pending notifications, resource names, and lock types. The thread identifications are some type of indicator used to track threads. Generally, this identification will be a handle to the thread, but it could be any method, number, or address used to identify a thread. The resource name entries are used to identify which resources are being accessed by which threads. In the example of FIG. 2, thread 210 (thread 1) is currently accessing SROs 231 and 232 through proxies 241 and 242, respectively. In addition, thread 250 (thread 2) is also accessing SRO 232 through proxy 242. Finally, thread 260 (thread 3) is accessing SRO 234 through proxy 244.

The lock type entry tells resource allocation mechanism 126 the type of lock on the shared resource. If the lock is exclusive, only one thread will be granted access to that resource at one time. Any additional threads requesting that resource will be blocked, meaning that resource allocation mechanism 126 will essentially ignore the request until the resource is freed. Once the resource becomes available, resource allocation mechanism 126 will cease blocking and will grant access to the requesting thread, updating shared resource registry 129 as needed. In FIG. 2, SRO 232 (SRO B) has a non-exclusive lock such that both thread 210 and thread 250 are allowed to access it at one time. However, SRO 231 (SRO A) and SRO 234 (SRO X) both have exclusive locks on them, meaning that any threads requesting these resources will be blocked.

The cancel pending entries indicate which thread has been marked for cancellation by thread manager 125. If thread 210 has access to several SROs, but is not releasing the SROs within a specified time or is in an infinite loop, the thread may be terminated by thread manager 125. As stated previously, a termination message can also be sent from a system administrator or a program that has noticed the thread's delay. This termination message is generally forwarded to thread manager 125. In these termination situations, thread manager 125 will preferably notify resource allocation mechanism 126 prior to actually terminating any threads. After thread manager 125 notifies resource allocation mechanism 126 that thread 210, in this example, has been marked for cancellation, resource allocation mechanism 126 will mark all instances of thread 210 in shared resource registry 129 as being marked for cancellation. This is shown in FIG. 2, where all of thread 210's (thread 1's) cancel pending entries indicate that this thread will be terminated in a short time.

There are four general ways in which a thread can interact with resource allocation mechanism 126 under this termination scenario. First, a thread could, while it is still running, attempt to access another SRO after the thread has been targeted for termination by thread manager 125 and resource allocation mechanism 126 has been notified of the termination. In this situation, resource allocation mechanism 126 will search shared resource registry 129 and find that the thread is marked for termination. Resource allocation mechanism 126 will notify the thread, usually through an exception, that it is to shutdown and release its SROs. An exception is a specific method of sending a message to a thread. Any messaging scheme known to those skilled in the art that would allow resource allocation mechanism 126 to notify a thread that it should release its resources may be used for this notification. An exception is generally not thrown before the thread asks for more SROs because resource allocation mechanism 126 has no means of communicating with the thread until the thread asks for another SRO. In addition to being notified that it must give up its currently owned shared resource objects, the thread is also denied its requested resource. This is the "gentle" method of terminating threads alluded to earlier. This method is gentle because the thread itself is given the opportunity to shut itself down and release its resources, including resources other than SROs. It is important to note that the programming model for the preferred embodiment of the present invention would preferably require that threads submit to this request by monitoring for the specified exception when accessing an SRO and then performing appropriate SRO releases and other cleanup. If, however, the thread does not submit to this request, the "violent" method of thread termination, described below, will take over.

The other three ways a thread will interact with resource allocation mechanism 126 in a termination scenario are as follows. Second, a thread could get "stuck," such as where the thread is in an infinite loop. Third, a thread would not be stuck but would never ask resource allocation mechanism 126 for another SRO. Finally, the thread could abnormally die. In these three cases, the previous solution where resource allocation mechanism 126 notifies the thread that it must shutdown will generally not work. This is particularly true because the thread will usually never request another SRO in these cases. For these situations, a more "violent" method of thread termination is used. In these cases, resource allocation mechanism 126 will suspend the thread, will retake control of the SROs being accessed by the thread, and will inform thread manager 125 that it may now terminate thread 210.

Resource allocation mechanism 126 is able to take control of the SROs being accessed by the thread because resource allocation mechanism 126 owns the SROs, and the thread actually interacts with proxies. A thread "thinks" that the proxies it is controlling are actually SROs. This is shown in FIG. 2, where proxies 241, 242, 243, and 244 are proxies for SROs 231, 232, 233, and 234, respectively. Any requests or data sent by the thread to the SRO actually go through the SRO's proxy, and resource allocation mechanism 126 routes these requests or data to the correct SRO. Any information going from the SRO to the thread is similarly sent to and routed through resource allocation mechanism 126. This allows the threads to have access to SROs while still allowing resource allocation mechanism 126 to regain control of the SROs at any time.

In the preferred embodiments of the present invention, the term "proxy" is used to indicate that proxies 241–244 represent the original SROs 231–234 and act almost as substitute objects for the SROs. "Proxy" is preferably not meant to include all attributes of proxies in object-oriented environments such as the Common Object Request Broker Architecture (CORBA). From the threads' points-of-view, proxies 241–244 are the original SROs 231–234; the threads do not know that they are not dealing directly with the SROs and are, instead, dealing with proxies.

Even though shared resource registry 129 has been shown as one registry, it is possible to separate this registry into two or more parts, depending on the implementation desired. Less desirable embodiments of the present invention could use only the cancel pending and thread identification fields. This would allow the "gentle" method of acquiring a thread's SROs, wherein resource allocation mechanism 126 will notify a thread that it must release its resources. Another embodiment could use only the functionality associated with the thread identifications, resource names, and lock types. This embodiment would then only implement the "violent" method of acquiring a thread's SROs, wherein resource allocation mechanism 126 retakes control of the SROs being used by the thread, suspends the thread, and requests that the thread manager terminate the thread. To act as a total solution, however, both methods would preferably be combined into one embodiment.

Figure 3:
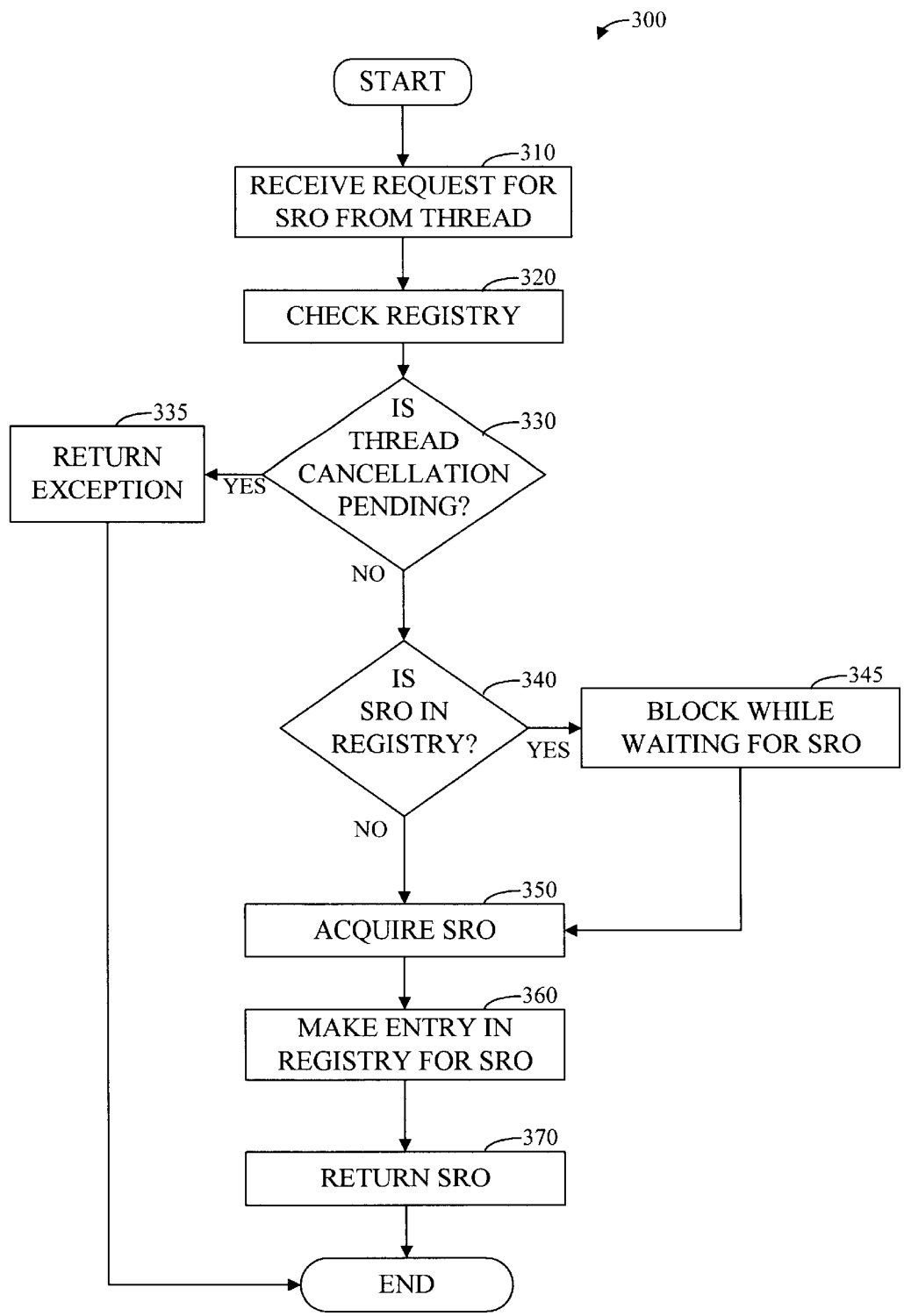
FIGS. 3 and 4 are flow diagrams depicting methods for implementing a shared resource registry according to a preferred embodiment of the present invention
Figure 4:
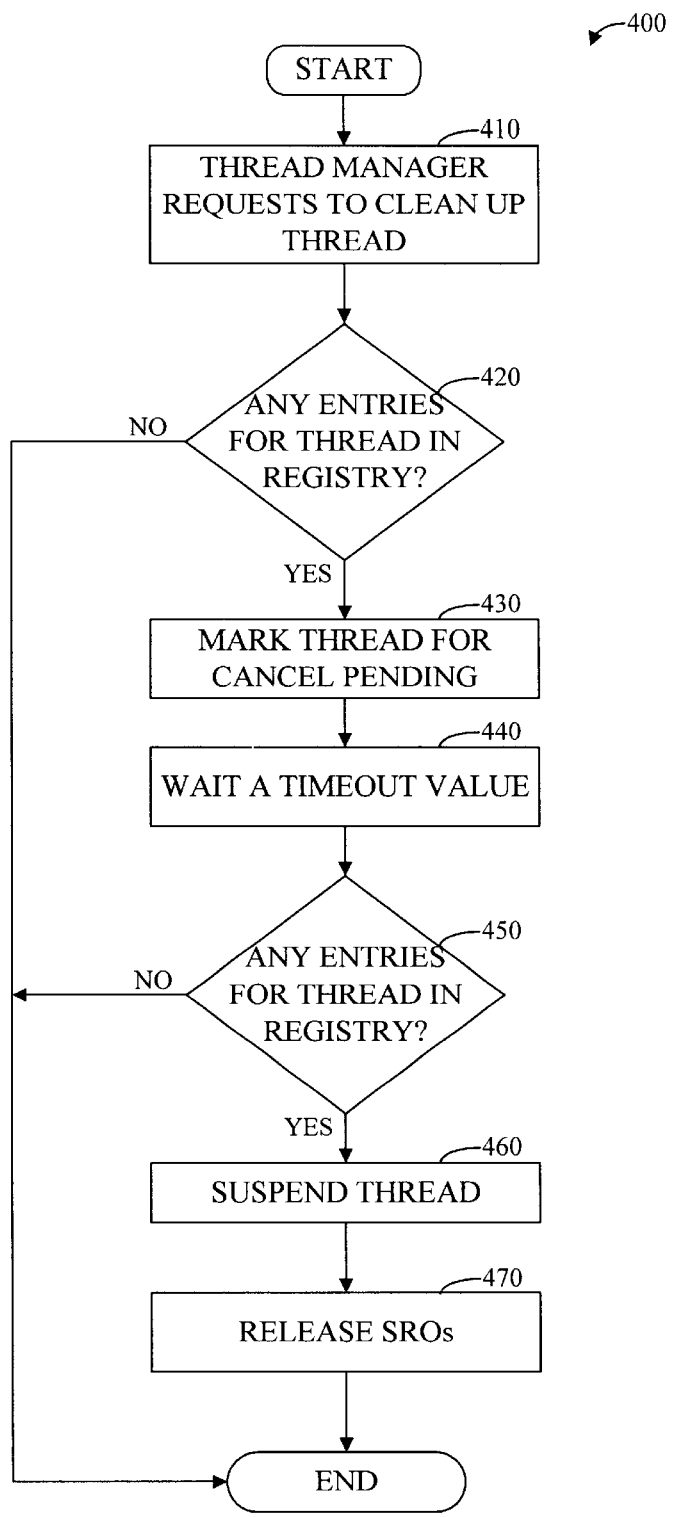

Referring now to FIG. 3, a first method 300 for releasing a thread's resources in accordance with a preferred embodiment of the present invention is shown. This method is akin to the "gentle" method of acquiring a thread's SROs, while FIG. 4 illustrates the more "violent" method of acquiring a thread's SROs. In the "gentle" method of acquiring a thread's SROs, resource allocation mechanism 126 attempts to allow the thread to shutdown normally and give up its resources, whereas in the "violent" method of acquiring a thread's SROs, the thread's resources are reacquired by resource allocation mechanism 126 and the thread will be terminated. In the most preferred embodiment of the present invention, both methods will preferably be used as one total solution to thread termination and SRO release problems. It is possible, however, for both methods, or parts of both methods, to be used separately as incomplete solutions to thread termination and SRO release problems. Naturally, using only one method or part of one method will generally mean that some entries in shared resource registry 129 will not be used; these entries may be removed or different entries added.

Returning to FIG. 3, whenever a request for an SRO is made by a thread, resource allocation mechanism 126 will receive a request for a SRO from a thread (step 310). Resource allocation mechanism 126 will then check shared resource registry 129 (step 320) to determine if the requesting thread has been marked for cancellation (step 330). If the requesting thread has been marked for cancellation (step 330=YES), then resource allocation mechanism 126 will return an exception to the requesting thread (step 335). As discussed previously, the requesting thread is expected to release all SROs that it controls or accesses at that time.

Alternatively, if the requesting thread is not scheduled for cancellation (step 330=NO), then resource allocation mechanism 126 will check shared resource registry 129 to determine whether or not the requested SRO is already entered into shared resource registry 129, indicating that the requested resource is already in use by another thread (step 340). If the requested resource is already entered into shared resource registry 129 (step 340=YES), then the request will be blocked (e.g., resource allocation mechanism 126 will wait), assuming an exclusive lock on the SRO, until the resource becomes available (step 345).

Once the resource becomes available or if the requested resource is not entered into consolidation registry 129, indicating that the requested resource is available (step 340=NO), then resource allocation mechanism 126 will acquire the requested SRO (step 350). Resource allocation mechanism 126 will make an entry in shared resource registry 129 (step 360) and make the requested SRO available to the requesting thread (step 370). After completing the above mentioned process, method 300 returns to step 310, awaiting another request for an SRO.

Referring now to FIG. 4, a second method 400 for releasing a thread's resources in accordance with a preferred embodiment of the present invention is shown. In this method, the thread is not responding or needs to be halted, and resource allocation mechanism 126 will gain control of the thread's SROs and recommend to the thread manager that it terminate the thread. Note that in FIG. 3 the thread initiates the contact with resource allocation mechanism 126, whereas in FIG. 4 the thread manager initiates the contact with resource allocation mechanism 126.

Method 400 begins when thread manager 125 requests resource allocation mechanism 126 to clean up a thread (step 410). This may occur whenever the thread manager believes that the thread needs to be terminated or the thread's resources are best given to another thread. Thread manager 125 will generally pass a thread handle to resource allocation mechanism 126 so that resource allocation mechanism 126 will know which thread to suspend. Any method known to those skilled in the art that would allow resource allocation mechanism 126 to know which thread to suspend may be used instead of a thread handle. Resource allocation mechanism 126 will check shared resource registry 129 to see if any entries for the thread are in the registry (step 420). An entry will indicate that a thread is using one or more resources. If there are no entries for the thread in shared resource registry 129 (step 420=NO), then resource allocation mechanism 126 will end and cease processing. If there is an entry for the thread (step 420=YES), then resource allocation mechanism 126 will mark the thread for cancel pending (step 430).

After resource allocation mechanism 126 marks the thread for cancel pending, resource allocation mechanism 126 will wait a user or system programmable timeout value (step 440). This is equivalent to setting a timer. After resource allocation mechanism 126 waits for this programmable time, resource allocation mechanism 126 next checks to ensure that there are no entries for the thread in the registry (step 450). Resource allocation mechanism 126 rechecks the registry again because the thread may have released its SROs of its own accord while resource allocation mechanism 126 waited for the programmable time period. In an embodiment using the method of FIG. 3, this could happen if the thread asked for another resource and resource allocation mechanism 126 refused to give it the resource and generated an exception. This is explained in reference to FIG. 3. Again, if there are no entries in shared resource registry 129 for the thread being terminated (step 450=NO), then resource allocation mechanism 126 will end or cease processing.

If there is at least one entry in shared resource registry 124 (step 450=YES), however, resource allocation mechanism 126 will then suspend the thread (step 460) and release and regain control of all of the thread's SROs. Resource allocation mechanism 126 will finally end or cease processing. When resource allocation mechanism 126 ends or ceases processing (in steps 420, 450 or 470), resource allocation mechanism 126 will generally indicate to thread manager 125 that the thread has been released or was not found in the shared resource registry 124. In addition, any necessary updates to shared resource registry 129 will generally be made during this step.

Finally, it should be noted that shared resource registry 129 and resource allocation mechanism 126 are preferably part of, or owned by, thread manager 125.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:

a processor coupled to a bus;

a memory coupled to the bus;

a plurality of threads residing in the memory; and a resource allocation mechanism residing in the memory, the resource allocation mechanism controlling accesses by the plurality of threads to at least one shared system resource by providing at least one entry for the at least one shared system resource in at least one registry if the at least one shared system resource is being accessed by at least one thread of the plurality of threads wherein the at least one entry in the at least one registry comprises at least one thread identification, at least one resource name, and at least one cancellation notation.

2. The apparatus of claim 1 wherein the at least one shared system resource is a plurality of shared system resources, and wherein the resource allocation mechanism generates an exception if one thread of the plurality of threads requests a shared system resource and the one thread has at least one entry in the at least one cancellation notation wherein the one thread is marked for cancellation.

3. The apparatus of claim 2 wherein the one thread will release any shared system resources the one thread owns after the one thread receives the exception.

4. The apparatus of claim 1 wherein the at least one shared system resource is a plurality of shared system resources, and wherein the resource allocation mechanism will release and regain control of all shared system resources controlled by one thread of the plurality of threads if the one thread has at least one entry in the at least one thread identification.

5. The apparatus of claim 4 wherein the apparatus further comprises a thread manager residing in the memory and wherein the thread manager notifies the resource allocation mechanism that the one thread is to be terminated, and the resource allocation mechanism releases and regains control of all shared system resources controlled by the one thread in response to the notification.

6. The apparatus of claim 5 wherein the resource allocation mechanism notifies the thread manager to terminate the one thread once the resource allocation mechanism has released and regained control of all shared system resources controlled by the one thread.

7. The apparatus of claim 1 wherein the at least one entry in the resource registry further comprises at least one lock type.

8. The apparatus of claim 7 wherein the resource allocation mechanism blocks requests by one thread of the plurality of threads for the at least one shared system resource if the at least one shared system resource is listed in the at least one registry and the lock type on the at least one shared system resource is exclusive.

9. The apparatus of claim 7 wherein the resource allocation mechanism allows requests by one thread of the plurality of threads for one shared system resource of the plurality of shared system resources if the one shared system resource is listed in the shared resource registry and the one shared system resource has a lock type of non-exclusive.

10. An apparatus comprising:

a processor coupled to a bus;

a memory coupled to the bus;

a plurality of threads residing in the memory; and a resource allocation mechanism residing in the memory, the resource allocation mechanism controlling accesses by the plurality of threads to a plurality of shared system resources by providing at least one entry for each shared system resource that is currently being accessed by at least one thread of the plurality of threads in a shared resource registry, the shared resource registry comprising at least one thread identification, at least one cancellation notification, and at least one resource name, the resource allocation mechanism owning each shared system resource of the plurality of shared system resources such that the resource allocation mechanism is able to take control of any shared system resource at any time.

11. The apparatus of claim 10 wherein each thread of the plurality of threads that is currently accessing at least one shared system resource of the plurality of shared system resources actually accesses a representation of the at least one shared system resource, the representation routing all messages from the thread to the at least one shared system resource and from the shared system resource to the thread.

12. The apparatus of claim 10 wherein the resource allocation mechanism allows access by one thread of the plurality of threads to at least one shared system resource of the plurality of shared system resources if the at least one shared system resource is not listed in the shared resource registry.

13. The apparatus of claim 12 wherein the resource allocation mechanism lists the at least one shared system resource in the shared resource registry.

14. The apparatus of claim 10 wherein the shared resource registry further comprises at least one lock type.

15. The apparatus of claim 14 wherein the resource allocation mechanism blocks requests by one thread of the plurality of threads for one shared system resource of the plurality of shared system resources if the one shared system resource is listed in the shared resource registry and the one shared system resource has a lock type of exclusive.

16. The apparatus of claim 14 wherein the resource allocation mechanism allows requests by one thread of the plurality of threads for one shared system resource of the plurality of shared system resources if the one shared system resource is listed in the shared resource registry and the one shared system resource has a lock type of non-exclusive.

17. The apparatus of claim 10 wherein the resource allocation mechanism generates an exception if one thread of the plurality of threads requests one shared system resource of the plurality of shared system resources and the one thread has at least one entry in the at least one cancellation notation where the one thread is marked for cancellation.

18. The apparatus of claim 17 wherein the one thread will release any shared system resources the one thread controls after the one thread receives the exception.

19. The apparatus of claim 10 wherein the resource allocation mechanism will release and regain control of all shared system resources controlled by one thread of the plurality of threads if the one thread has at least one entry in the at least one thread identification.

20. The apparatus of claim 19 wherein the apparatus further comprises a thread manager residing in the memory and wherein the thread manager notifies the resource allocation mechanism that the one thread is to be terminated, and the resource allocation mechanism releases and regains control of all shared system resources controlled by the one thread in response to the notification.

21. The apparatus of claim 20 wherein the resource allocation mechanism notifies the thread manager to terminate the one thread once the resource allocation mechanism has released and regained control of all shared system resources controlled by the one thread.

22. A method for controlling access to a plurality of shared system resources in a multi-threaded computer environment, the method comprising the steps of:
   a) creating at least one registry;
   b) registering at least one shared system resource of the plurality of shared system resources in the at least one registry by creating at least one entry in the at least one registry for the at least one shared system resource wherein the at least one entry in the at least one registry comprises at least one thread identification, at least one resource name, and at least one cancellation notation; and
   c) using the at least one entry in the at least one registry to control access to the at least one shared system resource.

23. The method of claim 22 wherein the step of using the at least one entry in the at least one registry to control access to the at least one shared system resource further comprises the following steps:
   d) determining if there is at least one entry for a thread in the at least one registry if a request is made by a thread manager to clean up the thread;
   e) suspending the thread if there is at least one entry for the thread in the at least one registry; and
   f) releasing all shared system resources controlled by the thread.

24. The method of claim 23 wherein the step of determining if there is at least one entry for the thread in the at least one registry further comprises the following steps:
   g) marking the thread for cancellation if there is at least one entry for the thread in the at least one registry;
   h) waiting a timeout value; and
   i) determining if there is at least one entry for the thread in the at least one registry.

25. The method of claim 22 wherein the step of using the at least one entry in the at least one registry to control access to the at least one shared system resource further comprises the following steps:
   d) checking the at least one registry to determine if the thread is scheduled for cancellation if a request for the at least one shared system resource is received from a thread; and
   e) generating an exception if the thread is scheduled for cancellation.

26. The method of claim 25 further comprising the following steps if the thread is not scheduled for cancellation:
   f) checking the at least one registry to determine if the at least one shared system resource is in the at least one registry;
   g) if the at least one shared system resource is not in the at least one registry, performing the following steps:
      i) acquiring the at least one shared system resource;
      ii) making an entry in the at least one registry for the at least one shared system resource; and
      iii) returning the at least one shared system resource to the thread that requested the at least one shared system resource.

27. The method of claim 26 further comprising the step of blocking while waiting for the at least one shared system resource to be released if the at least one shared system resource is listed in the at least one registry.

28. A method for controlling access by a plurality of threads to a plurality of shared system resources in a multi-threaded computer environment, the method comprising the steps of:

a) creating a shared resource registry comprising at least one thread identification, at least one cancellation notation, and at least one resource name;

b) registering at least one shared system resource of the plurality of shared system resources in the shared resource registry if the at least one shared system resource is being accessed by at least one thread of the plurality of threads, the registration comprising entering the identification of the one thread in the at least one thread identification and entering the shared system resource in the at least one resource name; and c) using the at least one thread identification, at least one cancellation notation, and at least one resource name in the shared resource registry to control access to the at least one shared system resource.

29. The method of claim 28 wherein the step of using the at least one thread identification, at least one cancellation notation, and at least one resource name in the shared resource registry to control access to the at least one shared system resource further comprises the following steps:

d) determining if there is at least one entry in the at least one thread identification for a thread in the shared resource registry if a request is made by a thread manager to clean up the thread;

e) suspending the thread if the at least one cancellation notice corresponding to the at least one thread identification indicates that the thread is to be canceled; and f) releasing all shared system resources controlled by the thread.

30. The method of claim 29 wherein the step of determining if there is at least one entry in the at least one thread identification for a thread in the shared resource registry if a request is made by a thread manager to clean up the thread further comprises the following steps:

g) marking the thread for cancellation in the at least one cancellation notification corresponding to the at least one thread identification corresponding to the thread if there is at least one entry in the at least one thread identification for the thread;

h) waiting a timeout value; and i) determining if there is at least one entry in the at least one thread identification for the thread.

31. The method of claim 28 wherein the step of using the at least one thread identification, at least one cancellation notation, and at least one resource name in the shared resource registry to control access to the at least one shared system resource further comprises the following steps:

d) checking the at least one cancellation notation corresponding to the at least one resource name corresponding to the at least one shared system resource to determine if a thread is scheduled for cancellation, if a request for the at least one shared system resource is received from the thread; and e) generating an exception if the thread is scheduled for cancellation.

32. The method of claim 31 further comprising the following steps if the thread is not scheduled for cancellation:

f) checking the shared resource registry to determine if the at least one shared system resource has a corresponding entry in the at least one shared resource name;

g) if the at least one shared system resource is not in the shared resource registry, performing the following steps:

i) acquiring the at least one shared system resource;

ii) entering an identification of the thread in the at least one thread identification and listing the shared system resource in the at least one resource name; and iii) returning the at least one shared system resource to the thread that requested the at least one shared system resource.

33. The method of claim 32 further comprising the step of blocking while waiting for the at least one shared system resource to be released if the at least one shared system resource is listed in the shared resource registry.

34. A program product comprising:

a resource allocation mechanism controlling accesses by a plurality of threads to at least one shared system resource by providing at least one entry for the at least one shared system resource in at least one registry if the at least one shared system resource is being accessed by at least one thread of the plurality of threads wherein the at least one entry in the at least one registry comprises at least one thread identification, at least one cancellation notation, and at least one resource name; and signal bearing media bearing the resource allocation mechanism.

35. The program product of claim 34 wherein the signal bearing media comprises transmission media.

36. The program product of claim 34 wherein the signal bearing media comprises recordable media.

37. The program product of claim 36 wherein the at least one shared system resource is a plurality of shared system resources, and wherein the resource allocation mechanism generates an exception if one thread of the plurality of threads requests a shared system resource and the one thread has at least one entry in the at least one cancellation notation wherein the one thread is marked for cancellation.

38. The program product of claim 37 wherein the one thread will release any shared system resources the one thread owns after the one thread receives the exception.

39. The program product of claim 34 wherein the at least one shared system resource is a plurality of shared system resources, and wherein the resource allocation mechanism will release and regain control of all shared system resources controlled by one thread of the plurality of threads if the one thread has at least one entry in the at least one thread identification.

40. The program product of claim 34 wherein a thread manager notifies the resource allocation mechanism that the one thread is to be terminated, and the resource allocation mechanism releases and regains control of all shared system resources controlled by the one thread in response to the notification.

41. The program product of claim 40 wherein the resource allocation mechanism notifies the thread manager to terminate the one thread once the resource allocation mechanism has released and regained control of all shared system resources controlled by the one thread.

42. The program product of claim 36 wherein the at least one entry in the resource registry further comprises at least one lock type.

43. The program product of claim 42 wherein the resource allocation mechanism blocks requests by one thread of the plurality of threads for the at least one shared system resource if the at least one shared system resource is listed in the at least one registry and the lock type on the at least one shared system resource is exclusive.

44. The program product of claim 42 wherein the resource allocation mechanism allows requests by one thread of the plurality of threads for one shared system resource of the plurality of shared system resources if the one shared system resource is listed in the shared resource registry and the one shared system resource has a lock type of non-exclusive.

45. A program product comprising a resource allocation mechanism controlling accesses by a plurality of threads to a plurality of shared system resources by providing at least one entry for each shared system resource that is currently being accessed by at least one thread of the plurality of threads in a shared resource registry, the shared resource registry comprising at least one thread identification, at least one cancellation notification, and at least one resource name, the resource allocation mechanism owning each shared system resource of the plurality of shared system resources such that the resource allocation mechanism is able to take control of any shared system resource at any time, and signal bearing media bearing the resource allocation mechanism.

46. The program product of claim 45 wherein the signal bearing media comprises transmission media.

47. The program product of claim 45 wherein the signal bearing media comprises recordable media.

48. The program product of claim 45 wherein each thread of the plurality of threads that is currently accessing at least one shared system resource of the plurality of shared system resources actually accesses a representation of the at least one shared system resource, the representation routing all messages from the thread to the at least one shared system resource and from the shared system resource to the thread.

49. The program product of claim 45 wherein the resource allocation mechanism allows access by one thread of the plurality of threads to at least one shared system resource of the plurality of shared system resources if the at least one shared system resource is not listed in the shared resource registry.

50. The program product of claim 49 wherein the resource allocation mechanism lists the at least one shared system resource in the shared resource registry.

51. The program product of claim 45 wherein the shared resource registry further comprises at least one lock type.

52. The program product of claim 51 wherein the resource allocation mechanism blocks requests by one thread of the plurality of threads for one shared system resource of the plurality of shared system resources if the one shared system resource is listed in the shared resource registry and the one shared system resource has a lock type of exclusive.

53. The program product of claim 51 wherein the resource allocation mechanism allows requests by one thread of the plurality of threads for one shared system resource of the plurality of shared system resources if the one shared system resource is listed in the shared resource registry and the one shared system resource has a lock type of non-exclusive.

54. The program product of claim 45 wherein the resource allocation mechanism generates an exception if one thread of the plurality of threads requests one shared system resource of the plurality of shared system resources and the one thread has at least one entry in the at least one cancellation notation where the one thread is marked for cancellation.

55. The program product of claim 54 wherein the one thread will release any shared system resources the one thread controls after the one thread receives the exception.

56. The program product of claim 54 wherein the resource allocation mechanism will release and regain control of all shared system resources controlled by one thread of the plurality of threads if the one thread has at least one entry in the at least one thread identification.

57. The program product of claim 56 wherein a thread manager notifies the resource allocation mechanism that the one thread is to be terminated, and the resource allocation mechanism releases and regains control of all shared system resources controlled by the one thread in response to the notification.

58. The program product of claim 57 wherein the resource allocation mechanism notifies the thread manager to terminate the one thread once the resource allocation mechanism has released and regained control of all shared system resources controlled by the one thread.

* * * * *